United States Patent [19]

Schneiter

[11] Patent Number: 4,960,970
[45] Date of Patent: Oct. 2, 1990

[54] METHOD AND APPARATUS FOR ACOUSTIC BREAKTHROUGH DETECTION

[75] Inventor: John L. Schneiter, Latham, N.Y.

[73] Assignee: General Electric Company, Schenectady, N.Y.

[21] Appl. No.: 392,494

[22] Filed: Aug. 11, 1989

[51] Int. Cl.$^5$ ............................................. B23K 26/00
[52] U.S. Cl. .............................. 219/121.6; 219/121.68; 219/121.7; 219/121.83
[58] Field of Search ....................... 219/121.61, 121.62, 219/121.67, 121.68, 121.69, 121.72, 121.83, 121.7

[56] References Cited

U.S. PATENT DOCUMENTS

| | | | |
|---|---|---|---|
| 3,700,850 | 10/1972 | Lumley et al. | 219/121.85 |
| 3,986,391 | 10/1976 | Vahaviolos | 219/121.63 |
| 4,316,467 | 2/1982 | Muckerheide | 219/121.63 X |
| 4,419,562 | 12/1983 | Jon et al. | 219/121.62 X |
| 4,504,727 | 3/1985 | Melcher et al. | 219/121.62 |

*Primary Examiner*—C. L. Albritton
*Attorney, Agent, or Firm*—Paul R. Webb, II; James C. Davis, Jr.

[57] ABSTRACT

Apparatus for laser processing, such as drilling of a workpiece, optionally has an optical fiber and output coupler for applying laser light to machine a workpiece and cause it to vibrate. An acoustic sensor is mounted on the workpiece, and a determining means, such as a computer, determines when the vibrations change, such as when they cease. The information can be used to change the laser pulse power and duration and the relative distance of the laser focal plane on the workpiece. A method of laser processing a workpiece causes vibrations in the workpiece by applying laser light to it, monitors the vibrations, and determines when they change.

18 Claims, 2 Drawing Sheets

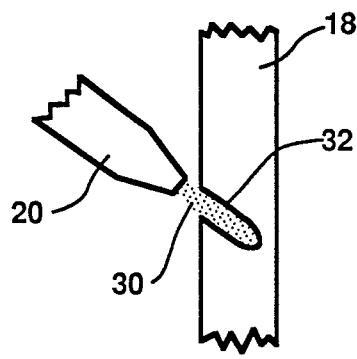
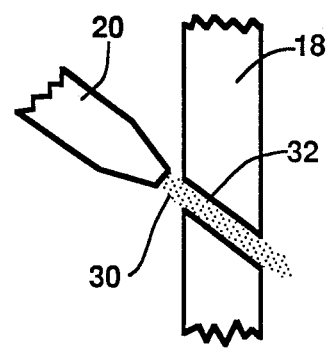
*Fig. 2A*  *Fig. 2B*
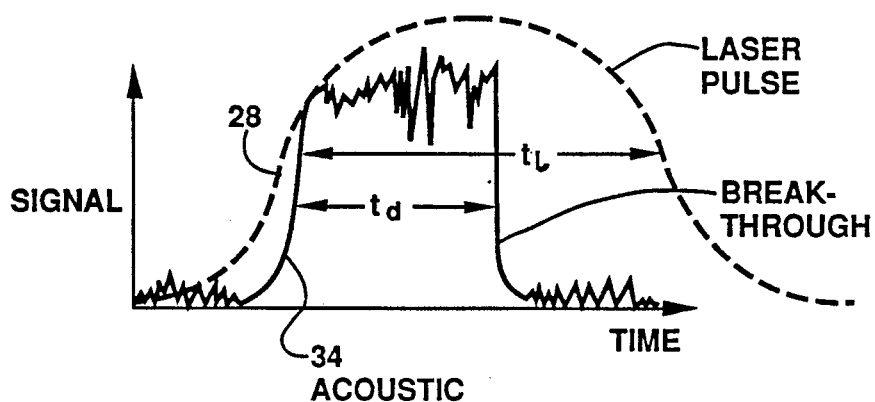
*Fig. 3*

METHOD AND APPARATUS FOR ACOUSTIC BREAKTHROUGH DETECTION

BACKGROUND OF THE INVENTION

The present invention relates to laser processing of a workpiece, and, more particularly, to determining breakthrough during drilling using a laser.

Of the three primary laser processing activities, namely cutting, welding, and drilling, drilling presents the most difficult control problem. Consider, for example, laser hole drilling of an aircraft engine combustor and afterburner parts. These parts are made from high temperature steel alloys and require tens of thousands of 0.020 inch (0.0508 cm) holes drilled at 20 degrees to the surface, where wall thickness may vary from 0.020 inch (0.0508 cm) to 0.080 inch (0.2032 cm). There are at present only two viable techniques for sensing hole properties (diameter, shape, recast layer thickness, etc.) for process control, namely, air flow testing and pin checking.

In air flow testing, the workpiece is removed from the drilling apparatus and a known pressure differential is applied across the workpiece. The resulting air flow is measured to give a measure of the flow resistance. In turn, this gives a measure of the drilled area, i.e., the diameter of the drilled holes and their shape as the number of holes drilled is known. This method is quite reliable for average hole diameter and shape, but only for fairly large ensembles of holes, and is not real-time in the sense that laser processing can take place while the flow test is being made. It is not a reliable indicator of other geometric properties, e.g. recast layer thickness, hole taper, etc.

In pin checking, the drilling is stopped, and then pins of successively increasing diameter are successively inserted into the holes. Pin checking is only approximate as an indicator of hole diameter because laser-drilled holes are rarely very straight, thus blocking insertion of the pins. It is also not a reliable indicator of other geometric properties nor is it a real time process.

While optical techniques might be used, they are unreliable, due to the angle involved and the length of the holes. Further, the large number of holes makes optical monitoring difficult.

One expected indirect indicator of the properties, such as diameter, of a laser-drilled hole is the "breakthrough time", or the fractional time to breakthrough as compared with the total laser pulse length. The longer the breakthrough time, the smaller the hole diameter because after breakthrough the laser light pulse enlarges the drilled hole.

It is therefore an object of the present invention to monitor a laser processing system, and particularly to determine breakthrough time during laser drilling.

SUMMARY OF THE INVENTION

Apparatus in accordance with the invention for laser processing of a workpiece comprises means for applying pulsed laser light to the workpiece to cause vibrations therein; means for acoustically monitoring said vibrations in the workpiece; and means for determining when said vibrations change.

A method in accordance with the invention for laser processing a workpiece comprises vibrating the workpiece by applying laser pulsed light thereto; acoustically monitoring said vibrations in the workpiece; and determining when said vibrations change.

BRIEF DESCRIPTION OF THE DRAWING

FIGS. 2A shows a laser beam incident on a workpiece during drilling, while FIG. 2B shows breakthrough; and FIGS. 3 shows signals generated during the drilling and at breakthrough.

DETAILED DESCRIPTION

Figure 1:
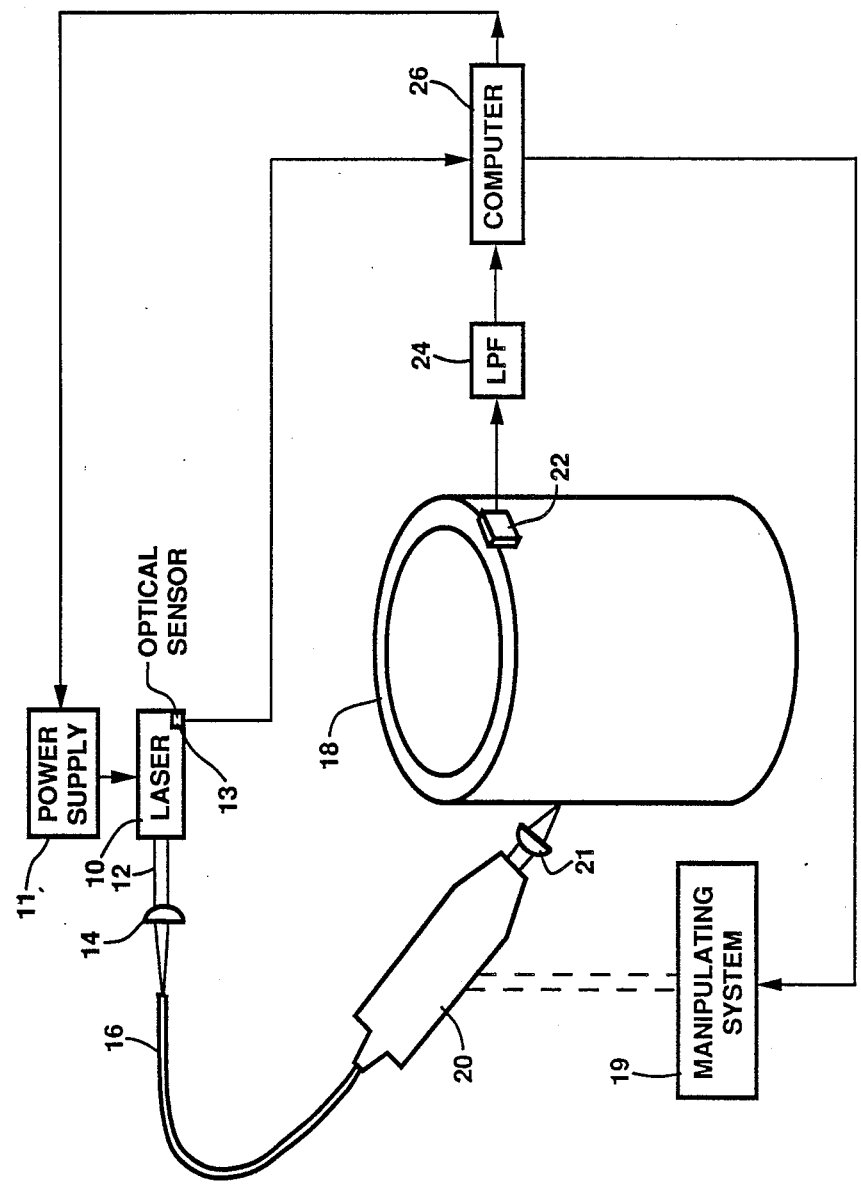
FIG. 1 shows a partly isometric and partly block diagram of an embodiment of the invention.

FIG. 1 shows a laser 10, such as a face pumped laser (FPL) of the Nd:YAG type. While other types of lasers can be used, FPLs are preferred since they have a high energy density, a large depth of field that does not require refocusing between pulses, and the beam quality becomes better at high powers. Furthermore, Nd:YAG provides an output at 1.06 $\mu$m, which is a good wavelength for processing a large number of materials. Laser 10 has excitation means, such as flash tubes (not shown), powered and controlled by power supply 11. Laser 10 also has an optical sensor 13, such as a photo diode, disposed on the outside of a totally reflecting cavity mirror to monitor light leakage since such a mirror is not is fact "totally" reflecting. An output signal from sensor 13 is applied to computer 26. An output light beam 12 from laser 10 is focussed by plano-convex lens 14 into optical fiber 16. Preferably, both ends of fiber 16 are prepared such as shown in U.S. Pat. Nos. 4,676,586 and 4,681,396 so that its cladding is not damaged by the injection or emitted laser light. If desired, light multiplexers, such as shown in U.S. Pat. No. 4,739,162 and U.S. patent application No. 944,771, filed Dec. 22 1986, (RD 16,982), can be used to allow simultaneous processing of a plurality of workpiece locations.

Fiber 16 is preferably held near workpiece 18 by an output coupler 20 such as shown in U.S. Pat. No. 4,799,755. The light beam 12 is focussed upon workpiece 18 by plano-convex lens 21. If desired, lens 21 can be incorporated in coupler 20, or eliminated depending upon the desired drilled hole diameter. Also if desired, coupler 20 can be eliminated altogether. Further, if desired, laser 10 can be positioned proximate workpiece 18 with beam 12 directly incident on workpiece 18, i.e., without lenses 14 and 21, fiber 16 and coupler 20. Coupler 20 is supported by a manipulation system 19 such as model HP-105 machine tool made by S. E. Huffman Corp., Clover, S.C. If desired, coupler 20 can be positioned at a fixed location and workpiece 18 mounted on a controllable positioner because in either embodiment the relative position of workpiece 18 with respect to coupler 20 is controllable.

Workpiece 18 can be a metal, e.g., steel, or aluminum, a plastic, or in general any reasonably solid material capable of transmitting laser drilling-induced vibrations when impulse excited. Further, workpiece 18 can be either stationary or moving, e.g., rotating. Although shown as a hollow right circular cylinder, workpiece 18 can have other shapes.

An acoustical sensor 22, such as an accelerometer or contact microphone, is mounted on the workpiece 18, or, if desired, on a baseplate (not shown) that supports workpiece 18. Alternately, a microphone can be disposed near workpiece 18, but this can result in undesirable ambient noise pickup. The signal from sensor 22 is applied to an anti-aliasing low pass filter (LPF) 24 with a cut off frequency of about 150 kHz although other frequencies can be used. If workpiece 18 is rotating, slip rings (not shown) or telemetry can be used to apply the signal from acoustic sensor 22 to LPF 24. The output signal from LPF 24 is applied to a computer 26. Output signals from computer 26 are applied to power supply 11 and also to manipulating system 19.

In operation, and as shown in FIG. 3, a light pulse 28 emitted by laser 10 is sensed by sensor 13 and applied to computer 26. Pulse 28 is also emitted from coupler 20 and, as shown in FIG. 2A, heats the material of workpiece 18 causing it to vaporize, and thus ejection of a high speed turbulent plasma 30 of the material and the drilling of a hole 32. Vibrations are set up in the parent (undrilled) material of workpiece 18 as a result of plasma 30 and molten material (not shown) ejection.

The characteristics of hole 32, e.g., diameter, recast layer thickness, etc., depends upon the energy in pulse 28. In particular, if the pulse is present after breakthrough, the hole diameter will be enlarged. These characteristics also depend upon the position of the focal plane of the laser beam on workpiece 18, if lens 21 is present, either in coupler 20 or externally thereto. In particular, if the focal plane is on the surface of workpiece 18, a larger diameter hole is drilled than if it is below the surface.

The turbulent flow causes vibrations in workpiece 18 due to its generally low damping. These vibrations are received by sensor 22 as signal 34 in FIG. 3 essentially instantaneously due to the generally high speed of sound in workpiece 18. At breakthrough, as shown in FIG. 2B, material from workpiece 18 is no longer strongly vaporized, and thus the vibrations and signal 34 are greatly and measurably reduced.

Computer 26 comprises an analog-to-digital converter operating at a frequency of 111 KHz to convert the signal from optical sensor 13. Other frequencies can be used. The converted signal is then applied to a decision algorithm, such as a threshold operation, which allows for the detection or determination of the onset and cessation of the laser pulse. The data resulting from this algorithm represents the optical pulse length $t_l$.

Computer 26 also comprises an analog-to-digital converter for the signal from LPF 24, which operates at a sampling frequency of 333 kHz although other frequencies can be used. In this case LPF 24 would have a cutoff frequency of not greater than one-half the sampling frequency as in accordance with the Nyquist criterion. Within computer 26 the vibration data from LPF 24 are digitized and then operated upon by a digital filter algorithm that acts as a bandpass filter, which in a particular embodiment has cutoff frequencies between about 40 to 80 kHz. These frequencies are caused by the vibrations due to the turbulent ejected flow. In general, the passband of interest will be a function of the workpiece 18 material and thickness, the wavelength of the laser light 12, the hole geometry, the rigidity of the fixture holding the workpiece 18, etc.

The bandpass-filtered waveform is operated upon by a fast Fourier transform algorithm (FFT) that does a spectral analysis. In a particular embodiment, each laser pulse of about 4 ms produced a total of 1536 samples. The first 128 samples are spectrally analysed by the FFT algorithm. Then a shift of 21 samples is made and 128 samples are spectrally analysed starting from the twenty first sample. The process is repeated until all 1536 samples are analysed.

A threshold decision algorithm is applied to the temporal spectral data resulting from the FFT to determine breakthrough. This can be a simple threshold level that is set to some fraction, e.g., one half, the maximum expected amplitude of the filtered frequencies to determine if these frequencies are present or not present at a particular time during drilling. The output data from this threshold decision algorithm is the acoustical signal pulse length $t_d$.

In FIG. 3, the acoustic signal 34 and the laser light signal 28 are shown. Computer 26 calculates the ratio of $t_l$ to $t_d$, i.e., breakthrough time, which is an indirect measure of hole diameter. This calculated breakthrough time is compared with an expected breakthrough time obtained from previous drilling data that has been previously stored on disk in computer 26.

This information is used to apply a control signal to power supply 11 to control laser pulse energy and, also, a control signal is applied to manipulation system 19 to change the relative distance between workpiece 18 and coupler 20. This changes the focal plane of the light pulse 28 with respect to workpiece 18. Thus by changing these two variables, an acceptable hole can be drilled during the next laser pulse 28. In particular, if actual breakthrough time is longer than expected breakthrough time (too small a hole diameter), the laser 10 pulse power is increased and the focal plane is positioned nearer the surface of workpiece 18. Similarly if the actual breakthrough time is shorter than the expected breakthrough time (too large a hole diameter), the laser 10 pulse power is decreased and the focal plane is positioned further below the surface of workpiece 18. Of course, if lens 21 is not present, then only the laser pulse power is controlled. In addition, if the breakthrough time suddenly becomes longer, it could indicate a defect in the optical system, e.g., a defect in fiber 16. Computer 26 can monitor this and supply an alarm signal for the operator.

It will be appreciated that although the above description is directed to drilling, the invention can be used with other processes, e.g., surface cladding, heat treating, cutting, etc., because they also produce ejected material, and therefore vibrations in workpiece 18. In this case, computer 26 might be programmed to sense a change in the sonic signature, e.g., frequencies, other than a cessation of vibration at a specific frequency.

What is claimed is:

1. Apparatus for laser processing of a workpiece, said apparatus comprising:
    means for applying pulsed laser light to the workpiece to cause vibrations therein;
    means for acoustically monitoring said vibrations in the workpiece, said monitoring means comprising an accelerometer adapted to be mounted on the workpiece; and
    means for determining when said vibrations change.

2. The apparatus of claim 1 wherein said applying means comprises an optical fiber having a first end for receiving laser light and a second end, and an output coupler coupled to said second end and adapted to be disposed proximate the workpiece.

3. Apparatus for laser processing of a workpiece, said apparatus comprising:
    means for applying pulsed laser light to the workpiece to cause vibrations therein;
    means for acoustically monitoring said vibrations in the workpiece;

means for determining when said vibrations change; and an optical sensor adapted to be disposed in said laser and coupled to said determining means.

4. The apparatus of claim 1 wherein said determining means comprises means for spectrally analysing said vibrations, and threshold means for deciding when the spectral content changes.

5. The apparatus of claim 4 wherein said means for determining comprises means for bandpass filtering said vibrations.

6. The apparatus of claim 5 wherein said bandpass filtering means has a passband between about 40 and 80 kHz.

7. The apparatus of claim 4 further comprising an optical sensor adapted to be disposed in said laser and coupled to said determining means.

8. The apparatus of claim 7 wherein said determining means determines the ratio of a vibration pulse length to that of a laser pulse length.

9. The apparatus of claim 1 further comprising means for focussing the laser light onto a focal plane, means for causing relative motion between said applying means and the workpiece coupled to said determining means to change the position of the focal plane with respect to the workpiece, and a controllable power supply coupled to the laser and said determining means for controlling the energy of the laser light.

10. Apparatus for determining breakthrough during pulsed laser drilling of a workpiece, said apparatus comprising:
means for acoustically monitoring vibrations in the workpiece caused by the drilling, said monitoring means comprising an accelerometer adapted to be mounted on the workpiece; and
means for determining when the spectral content of said vibrations changes.

11. The apparatus of claim 3 wherein said monitoring means comprises an accelerometer adapted to be mounted on the workpiece.

12. The apparatus of claim 3 wherein said applying means comprises an optical fiber having a first end for receiving laser light and a second end, and an output coupler coupled to said second end and adapted to be disposed proximate the workpiece.

13. The apparatus of claim 3 wherein said determining means comprises means for spectrally analyzing said vibrations, and threshold means for deciding when the spectral content changes.

14. The apparatus of claim 13 wherein said means for determining comprises means for bandpass filtering said vibrations.

15. The apparatus of claim 14 wherein said bandpass filtering means has a passband between about 40 and 80 kHz.

16. The apparatus of claim 3 wherein said determining means determines the ratio of a vibration pulse length to that of a laser pulse length.

17. The apparatus of claim 3 further comprising means for focussing the laser light onto a focal plane, means for causing relative motion between said applying means and the workpiece coupled to said determining means to change the position of the focal plane with respect to the workpiece, and a controllable power supply coupled to the laser and said determining means for controlling the energy of the laser light.

18. Apparatus for determining breakthrough during pulsed laser drilling of a workpiece, said apparatus comprising:
means for acoustically monitoring vibrations in the workpiece caused by the drilling;
means for determining when the spectral content of said vibrations changes; and
an optical sensor adapted to be disposed in said laser and coupled to said determining means.

* * * * *

UNITED STATES PATENT AND TRADEMARK OFFICE
CERTIFICATE OF CORRECTION

PATENT NO.   :   4,960,970

DATED        :   Oct. 2, 1990

INVENTOR(S)  :   John L. Schneiter and Angel L. Ortiz, Jr.

It is certified that error appears in the above-identified patent and that said Letters Patent is hereby corrected as shown below:

On the title page, in item [75], add --Angel L. Ortiz, Jr-- as a joint inventor.

Signed and Sealed this

Seventh Day of April, 1992

Attest:

HARRY F. MANBECK, JR.

*Attesting Officer*   *Commissioner of Patents and Trademarks*